United States Patent [19]

Liedenbaum

[11] Patent Number: 5,687,260
[45] Date of Patent: Nov. 11, 1997

[54] OPTICAL FIBER SWITCH USING FOUR GATE DIRECTIONAL COUPLER AND CONTROL PULSE

[75] Inventor: Coen T. H. F. Liedenbaum, Eindhoven, Netherlands

[73] Assignee: U.S. Philips Corporation, New York, N.Y.

[21] Appl. No.: 611,157

[22] Filed: Mar. 5, 1996

[30] Foreign Application Priority Data

Mar. 15, 1995 [EP] European Pat. Off. ............ 95200618

[51] Int. Cl.$^6$ .................................................. G02B 6/26
[52] U.S. Cl. ........................... 385/16; 385/15; 385/24; 385/42; 385/27; 385/122
[58] Field of Search .................................. 385/14, 15, 16, 385/24, 27, 31, 39, 42, 47, 122

[56] References Cited

U.S. PATENT DOCUMENTS

| | | | |
|---|---|---|---|
| 4,962,987 | 10/1990 | Doran | 385/122 X |
| 4,973,122 | 11/1990 | Cotter et al. | 385/122 X |
| 5,144,375 | 9/1992 | Gabriel et al. | 385/16 X |
| 5,146,517 | 9/1992 | Avramopoulos et al. | 385/122 X |
| 5,151,818 | 9/1992 | Thijs et al. | 359/344 |
| 5,301,008 | 4/1994 | Huang et al. | 385/16 X |
| 5,357,359 | 10/1994 | Uchiyama et al. | 385/24 X |
| 5,473,712 | 12/1995 | Blow et al. | 385/16 |

OTHER PUBLICATIONS

Sokoloff et al., "A Terahertz Optical Asymmetric Demultiplexer (TOAD)", IEEE Photonics Technology Letters, vol. 5, No. 7, Jul. 1993, pp. 787–790.

*Primary Examiner*—Brian Healy
*Attorney, Agent, or Firm*—Michael E. Marion

[57] ABSTRACT

The invention relates to an optical switch which is switchable by means of light. The switch includes a directional coupler having four gates, the first gate of which forms part of an input of the switch for receiving an optical data pulse series, the second gate forms part of an output of the switch and the third gate and the fourth gate are interconnected by means of a waveguide structure. This waveguide has a non-linear optical portion at an asymmetrical position in the waveguide. A control pulse signal is also introduced into the waveguide via the first gate of the directional coupler. The waveguide is asymmetrical for the data pulse series and symmetrical for the control pulse signal.

10 Claims, 2 Drawing Sheets

OPTICAL FIBER SWITCH USING FOUR GATE DIRECTIONAL COUPLER AND CONTROL PULSE

BACKGROUND OF THE INVENTION

The invention relates to an optical switch which is, switchable by means of radiation, comprising a directional coupler having four gates, the first gate of which forms part of an input of the switch for receiving an optical data pulse series, the second gate forms part of an output of the switch and the third and the fourth gate are interconnected by means of a waveguide structure which has a non-linear optical portion offset from the centre of said structure, the switch further comprising means for coupling a control pulse signal into the waveguide.

An optical switch of the type mentioned in the opening paragraph is known from, for example the article: "A terahertz optical asymmetric demultiplexer (TOAD)" by J. P. Sokoloff et al. in IEEE Photonics Technology Letters, Vol. 5, No. 7, July 1993. In the switch described in this article the waveguide structure is constituted by an optical fibre and the non-linear optical portion is constituted by a semiconductor laser amplifier. The two ends of the fibre are interconnected by means of a directional coupler so that a ring is obtained. When radiation is introduced at the input of the switch, it will be split up by the coupler into two sub-signals which will propagate through the ring in opposite directions. The semiconductor laser amplifier is present at an asymmetrical position in the ring, i.e. offset from the centre of the ring so that the two sub-signals will arrive there at different instants. The centre of the ring is to be understood to mean the position where two sub-signals propagating in opposite directions will arrive simultaneously. The extent of asymmetry can be adjusted by varying the position of the amplifier in the ring. Without further measures, the two sub-signals will interfere in such a way that substantially all radiation is returned to the input and that there is hardly any or no intensity measurable at the output. In this case, the structure behaves as a mirror. In fact, the intensity of the sub-signals is too weak to saturate the amplifier. Consequently, a control pulse signal is injected into the waveguide structure by means of an extra coupler. These control pulses propagate through the ring in one direction only and will saturate the amplifier if they have a sufficient intensity. Saturation of the amplifier disturbs the charge carrier density resulting in a change of the refractive index. This change of the refractive index leads, inter alia, to a phase change of radiation propagating through the amplifier. The control pulses and the pulses of the signal introduced at the input are synchronized with each other in such a way that the control pulses arrive in the amplifier between the arrival of the first sub-signal in the amplifier and the arrival of the second sub-signal in the amplifier. In that case, the first sub-signal will be amplified and passed by the amplifier. Subsequently, the control pulse arrives at the amplifier so that the amplifier is saturated. When the second sub-signal arrives at the amplifier in a period when it is saturated, this signal will also be amplified and passed but also undergo a phase change. In this way, a phase difference is produced between the two sub-signals propagating in opposite directions. Provided that this phase difference is large enough, constructive interference will occur at the output of the switch. In this case, the switch is open. The time when the switch is open is determined by the length of the control pulses and the distance $\Delta x$ between the semiconductor laser amplifier and the centre of the waveguide structure.

A drawback of the switch described above is that not only the desired data pulse is supplied from the output of the switch, but also a portion of the relevant control pulse. If a 50:50 coupler is used, this is at least half the intensity of the control pulses amplified by the amplifier, which intensity will generally be much larger than the intensity of an amplified data pulse. To be able to suppress the control pulse signal, a wavelength-sensitive filter is to be arranged behind the output, which filter passes the data signal and blocks the control pulse signal. In practice, such a filter is difficult to realise. Moreover, the wavelengths of the data signal and of the control pulse signal should sufficiently differ from each other and be known in advance so as to be able to realise the desired suppression. This limits the possibilities of application of the switch to a considerable extent.

SUMMARY OF THE INVENTION

It is an object of the invention to provide an optical switch in which the data signal prevails in the supplied radiation and in which the optical losses are considerably reduced, while having dimensions allowing it to integrated with other electronic components.

To this end, the optical switch according to the invention includes means are constituted by the first gate of the directional coupler, with the switch substantially symmetrical for the control pulse signal and asymmetrical for the data pulse series.

The centre of the waveguide structure is understood to mean the position in the structure where two sub-signals traversing the structure in opposite directions arrive simultaneously.

Symmetrical is understood to mean that two sub-signals generated by the directional coupler and propagating in opposite directions will destructively interfere at the output of the switch.

Asymmetrical is understood to mean that two sub-signals generated by the directional coupler and propagating in opposite directions will constructively interfere at the output of the switch.

Since the control pulse signal is also applied to the input of the switch, the extra coupler in the waveguide structure can be dispensed with. This results in a considerable reduction of the optical losses in the waveguide structure. Moreover, the switch is more compact so that it can be integrated with other electronic components.

Since the control pulses are also injected into the waveguide structure via the directional coupler, its pulses will also be split into two sub-pulses which will propagate through the waveguide structure in opposite directions. Consequently, these sub-pulses will destructively interfere at the output of the switch if there is no phase change or if there is an identical phase change in the sub-pulses so that much more intensity of these pulses appears at the input than at the output of the switch. Consequently, the wavelength-sensitive filter arranged at the output to suppress the control pulses can be dispensed with.

A preferred embodiment of the optical switch according to the invention is characterized in that the non-linear optical element is arranged at a distance d from the centre of the optical switch, for which it holds that:

$$d/c' = dx/c' \pm \Delta x'/c'$$

in which $dx/c' = T/4 + n.T/2$ and $\Delta x'/c' \sim |t_1 - t_2|$, in which $c'$ is the velocity of light in the waveguide structure, T is the pulse period of the control pulse signal, n is an integer, $t_1$ and $t_2$ are the respective arrival times of the first and the second sub-pulse of the control pulse signal in the non-linear optical portion, for which it holds that $t_1 + t_2 = T$, with $t_1 \neq t_2$.

Preferably, d/c' is substantially equal to the expression given. In that case, the phase change of the sub-pulses of the control pulse signal will be such that, after passage through the waveguide structure, there will be no phase difference or hardly any phase difference between the two control sub-pulses propagating in opposite directions, so that there is hardly any or no intensity of the control pulse signal at the output of the switch. However, this is indeed the case for the two sub-pulses of the data signal propagating in opposite directions. At least one of the sub-pulses of the data pulse signal passes the amplifier at an instant when the amplifier is saturated, so that the relevant sub-pulse will undergo a phase change. The phase difference thus produced between the two sub-pulses leads to constructive interference at the output of the switch. The switch is then opened. The size of the window of the switch is determined by the pulse width of a control pulse and by the distance $\Delta x'$. $\Delta x'$ is the distance by which dx is increased or decreased in order that asymmetry occurs for the data signal. When the total distance d between the amplifier and the centre of the waveguide structure is $dx \pm \Delta x'$, the switch will be substantially symmetrical for the control pulse signal and asymmetrical for the data signal. It then holds that $\Delta x'/c' = |t_1 - t_2|$, in which $t_1 + t_2 = T$ and $t_1 \neq t_2$, with $t_1$ and $t_2$ being the respective arrival times of the first and the second sub-signal of the control pulse in the non-linear optical portion.

The effect as a result of the deviation $\Delta x'/c'$ with respect to $dx/c' = T/4 + n.T/2$ in the embodiment of the improved TOAD corresponds to the effect caused by the distance $\Delta x$ of the amplifier with respect to the centre of the waveguide structure in a conventional TOAD as described above. The extra coupler can thus be dispensed with in that the distance of the amplifier off the centre in a conventional TOAD is added to or subtracted from the distance for which the delay time is $T/4 + n.T/2$ when T is the pulse period of the control pulse signal.

A further embodiment of the optical switch according to the invention is characterized in that the non-linear optical portion comprises a semiconductor laser amplifier.

The non-linear optical potion may comprise, for example, an element of a non-linear optical material such as, for example InP. A particularly suitable element is a semiconductor laser amplifier because the generally relatively weak data signal in the switch undergoes an amplification.

In a further embodiment of the optical switch according to the invention, the semiconductor laser amplifier is polarization-insensitive.

An amplifier of this type is known per se from U.S. Pat. No. 5,151,818 in the name of the Applicant. Another embodiment is described in the non-prepublished European Patent Application EP 94203593.2 also in the name of the Applicant. By making use of such an amplifier, polarization-controlling elements in the waveguide structure can be dispensed with, which elements should ensure that the sub-pulses of the data signal interfering at the output of the switch have the suitable direction of polarization at a sufficiently large phase difference so as to be able to interfere constructively.

These and other aspects of the invention will be apparent from and elucidated with reference to the embodiments described hereinafter.

DETAILED DESCRIPTION OF THE PREFERRED EMBODIMENTS

Figure 1:
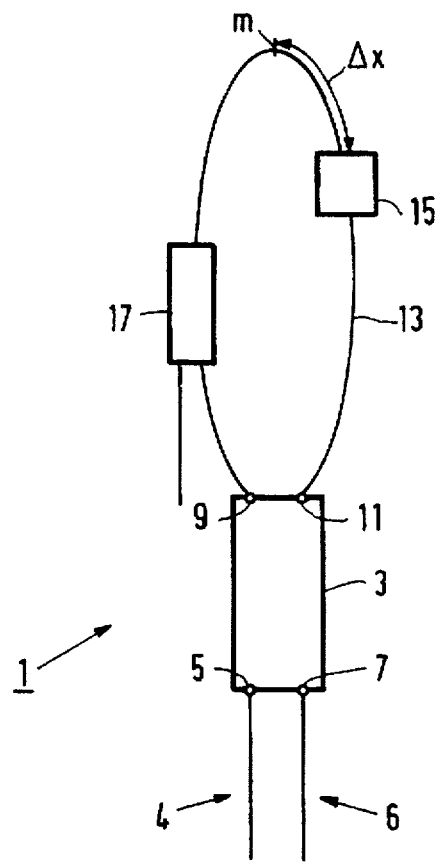
FIG. 1 is a diagrammatic representation of a known optical switch.

The optical switch 1 shown in FIG. 1 comprises a directional coupler with a first gate 5, a second gate 7, a third gate 9 and a fourth gate 11. The first gate 5 forms part of the input 4 of the switch 1 and the second gate 7 forms part of the output 6 of the switch 1. The third gate 9 and the fourth gate 11 are interconnected by means of an optical waveguide structure 13. The waveguide structure 13 may consist of optical linear material as well as of optical non-linear material such as, for example an optical fibre. Radiation introduced at the input 4 of the switch will be split up into two sub-signals by the directional coupler 3, which sub-signals will propagate through the waveguide 13 in opposite directions. The optical waveguide structure 13 comprises a non-linear optical element 15. This element may be formed from InP. The element 15 is preferably a semiconductor laser amplifier because the generally relatively weak data signal in the switch will undergo an amplification.

The element 15 is arranged asymmetrically in the waveguide 13, i.e. at a distance $\Delta x$ from the centre m of the waveguide 13. The centre of the waveguide 13 is understood to mean the position where sub-signals propagating in opposite directions arrive simultaneously. Moreover, a control pulse signal having a pulse period T is coupled into the waveguide 13 via an extra coupler 17. When a data signal in the form of an optical pulse series is introduced at the input 4 of the switch 1, this signal will be split up into two sub-signals which will propagate through the waveguide 13 in opposite directions. The two sub-signals reach the amplifier 15 at different instants but are both amplified and subsequently passed. Without the presence of the control pulse signal, the two sub-signals will each maintain their phase and subsequently interfere destructively at the output 6 of the switch. In this way, them will be much more intensity at the input 4 than at the output 6. In fact, the intensity of the sub-pulses of the data signal is not high enough to saturate the amplifier. By injecting control pulses into the waveguide 13, the asymmetry introduced by the amplifier will become effective. The control pulses propagate in one direction only and have a sufficient intensity to saturate the amplifier. The control pulse signal and the data signal are synchronized with each other in such a way that a control pulse will arrive at the amplifier in the time interval between the arrival of the first sub-signal of a data pulse at the amplifier and the arrival of the second sub-signal of this data pulse at the amplifier. The saturation of the amplifier 15 results in a disturbance of the charge carrier density. Consequently, the refractive index changes so that there will be a phase change for radiation propagating through the saturated amplifier. The first sub-signal is amplified and passed by the amplifier. Subsequently, the control pulse signal ensures the saturation of the amplifier. The second sub-signal arriving after the saturation, but before the desaturation period has elapsed, is also amplified and passed but also undergoes a phase change. Consequently, a phase difference between the two sub-signals of the relevant data pulse propagating in opposite directions is produced. If this phase difference is large enough, and provided that the directions of polarization of the two sub-signals so allow, there will be constructive interference at the output 6 of the switch 1. The switch I is now open. The period during which the switch 1 is open is determined by the width of the control pulses and the distance Δx between the amplifier 15 and the centre m of the waveguide 13.

In the embodiment described, radiation of the data signal as well as radiation of the control pulse signal, whose intensity is generally much stronger, is produced at the output 6 of the switch 1. A solution is to arrange a wavelength-selective filter (not shown) at the output 6 of the switch 1, but in practice such a filter is difficult to realise, particularly when the wavelengths are close together. A further drawback is that the wavelengths of the data signal and of the control pulse signal should be known in advance, which reduces the possibilities of use of the switch to a considerable extent.

Figure 2:
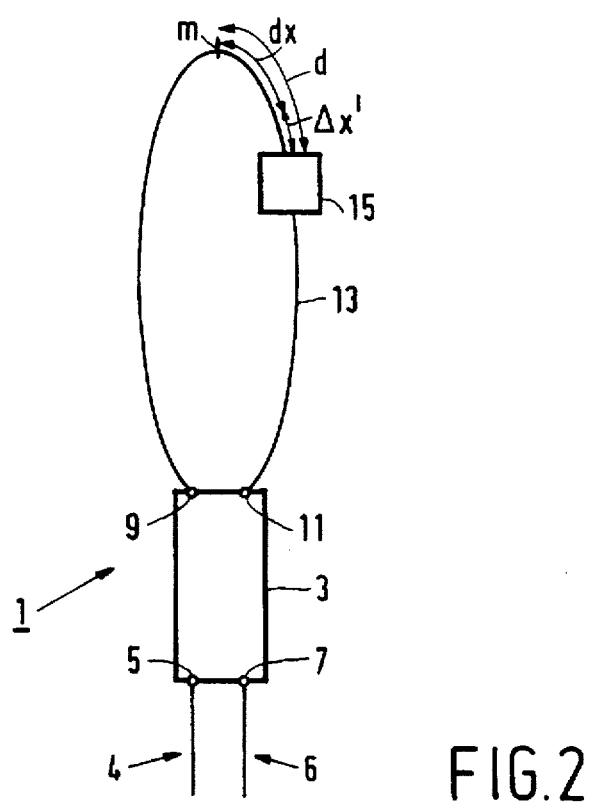
FIG. 2 is a diagrammatic representation of an optical switch according to the invention.

FIG. 2 shows diagrammatically an embodiment of the switch according to the invention, in which the above-mentioned drawbacks are obviated. Components corresponding to those in the switch shown in FIG. 1 have the same reference numerals.

In the switch 1 shown in FIG. 2, the control pulse signal is introduced into the waveguide 13 via the input 4 of the switch, where the data signal is also introduced into the waveguide 13.

In addition to the pulses of the data signal, the pulses of the control pulse signal are also split into two sub-signals which will propagate through the waveguide 13 in opposite directions. Whenever a sub-pulse of the control pulse signal arrives at the amplifier 15, this amplifier will saturate, provided that the intensity of this sub-pulse is sufficiently high. This can be ensured by giving the directional coupler 3 the suitable split-up ratio, such that the weakest of these two sub-pulses still has a sufficient intensity. The coupler 3 may still be a 50:50 coupler. By choosing a suitable distance d for the amplifier 15 to the centre m of the waveguide structure 13, it can be ensured that the waveguide 13 is substantially symmetrical for the control pulse signal, but asymmetrical for the data signal. In that case, the sub-pulses of the control pulse signal will interfere destructively at the output 6 of the switch 1 and substantially all its intensity will be measured at the input 4. The switch 1 operates as a mirror for the control pulse signal. However, the sub-pulses of the data signal will have a mutual phase difference when they arrive at the directional coupler 3 again. If this phase difference is large enough, and provided that the directions of polarization of the two sub-pulses allow, there will be constructive interference and a pulse of the data signal will appear at the output of the switch. The width of this pulse, in other words, the width of the window of the switch, is determined by the width of the control pulses and by the difference of the distance of the amplifier to the centre, for which distance there is symmetry for both the control pulse signal and the data signal. Mainly radiation coming from the data signal now appears at the output of the switch so that it is no longer necessary to use a wavelength-selective filter at the output for blocking the control pulse signal.

Moreover, the extra coupler 17 may be dispensed with, so that the optical losses in the waveguide 13 are reduced considerably and the switch 1 becomes more compact and can thus be integrated with other electronic components.

The intensity of the data pulse signal generated at the output and the suppression of the control pulse signal can be optimized by optimizing the distance d of the amplifier to the centre of the waveguide structure. It preferably holds that:

$$d/c' \cong dx/c' \pm \Delta x'/c'$$

with $dx/c'=T/4+n.T/2$ and $\Delta x'/c' \sim |t_1 - t_2|$ in which $c'$ is the velocity of light in the waveguide structure, T is the pulse period of the control pulse signal, n is an integer, $t_1$ and $t_2$ are the respective arrival times in the amplifier of the first and the second sub-pulse of the control pulse signal, in which $t_1+t_2=T$, with $t_1 \neq t_2$.

This will now be illustrated with reference to a numerical example. If the pulse period of the control pulse signal is, for example 100 psec and $dx/c'=25$ psec and $\Delta x'/c'=0$, then the amplifier will be saturated with a period which is equal to 50 psec. If $d/c'$ is exactly equal to 25 psec, there will not only be symmetry for the control pulses but also for the data pulses so that they will also cause destructive interference at the output of the switch. If $\Delta x'/c' \sim |t_1 - t_2| \neq 0$, the phase difference between the two sub-pulses of a control pulse propagating in opposite directions will be still sufficiently small so that there will be hardly any or no constructive interference at the output for the control pulse. However, for the data pulse there will be sufficient asymmetry in the waveguide structure so as to realise a phase difference giving rise to constructive interference at the output.

The semiconductor laser amplifier 15 is preferably an amplifier which is insensitive to polarization. In fact, polarization-controlling elements are generally required in the waveguide structure 13 to ensure that the two sub-signals have such directions of polarization that them will also be effective constructive interference at a sufficiently large phase difference between the two sub-signals of a data pulse, so that constructive interference is possible. When an amplifier which is insensitive to polarization is used, these polarization-controlling elements may be dispensed with.

Figure 3A:
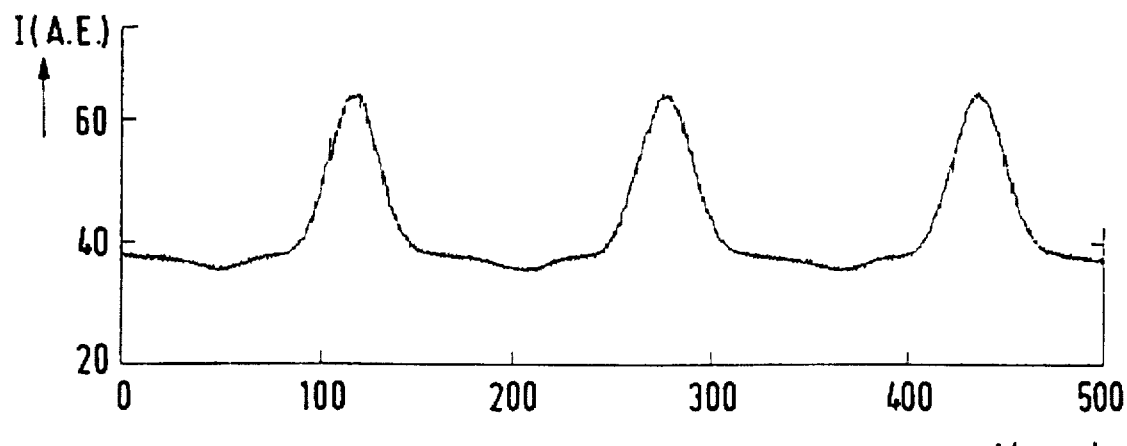
FIGS. 3a, 3b and 3c show some graphs in which the effect of the introduction of the control pulses into the switch according to the invention is illustrated.
Figure 3B:
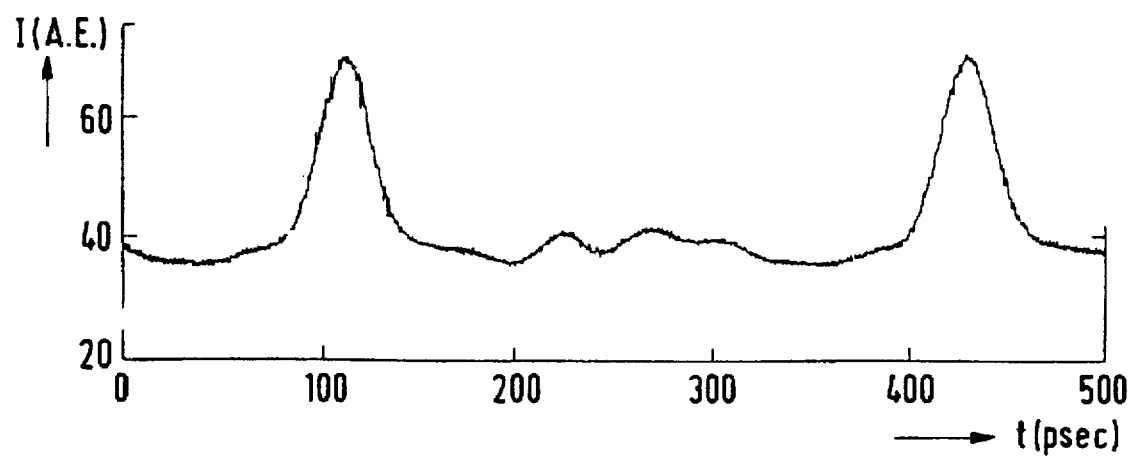
Figure 3C:
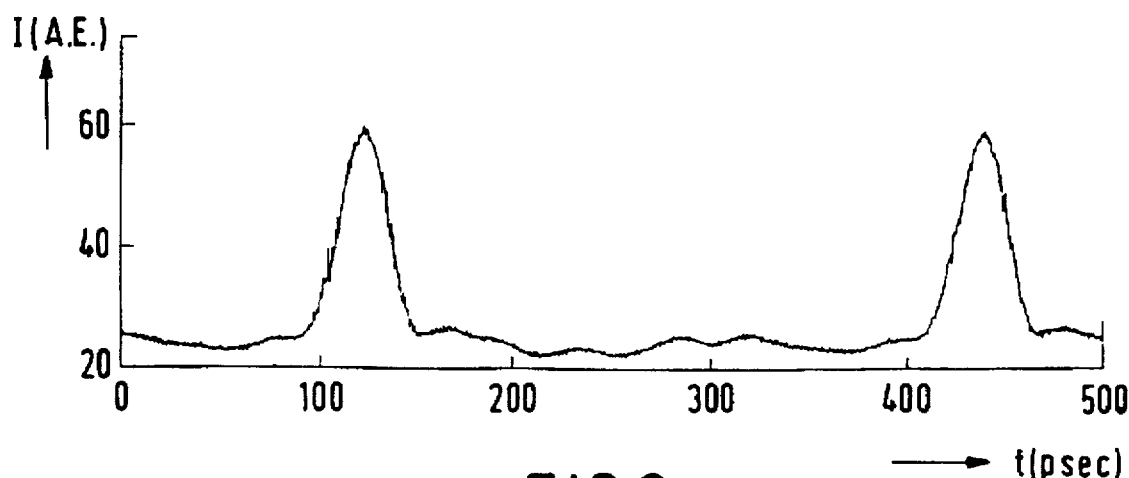

FIGS. 3a, 3b and 3c show some graphs to illustrate the effect of an optical switch according to the invention on a data pulse series introduced at the input.

FIG. 3a shows an example of a data pulse series applied to the switch. FIG. 3b shows the data pulse series generated at the output of the switch, with the central pulse being switched off by the switch according to the invention. FIG. 3c also shows the data pulse series generated at the output of the switch, using a further filter for decreasing the intensity level of the spontaneous emission. When FIGS. 3b and 3c are compared, it will be clear that the discrimination between the "zero" level and a data pulse has remained approximately equal, from which it is apparent that a filter has become redundant.

An optical switch as described above may be used to great advantage in optical telecommunication systems. The switch may be used in the transmitter of such systems for modulating, for example an optical pulse series with data. By arranging a plurality of such switches in parallel, a plurality of data signals can be applied to the same channel in order to achieve a higher transmission rate. A switch according to the invention may be used as a demultiplexer in the receiver of an optical telecommunication system, in other words, for disseminating data signals transmitted through the same transmission channel into separate signals again.

I claim:

1. An optical switch switchable in response to radiation, comprising:
    a directional coupler, said directional coupler comprising:
        a first gate forming part of an input of the switch and receiving an optical data pulse series,
        a second gate forming part of an output of the switch, third gate, and
        a fourth gate;
    a waveguide structure interconnecting the third gate and the fourth gate and comprising a non-linear optical portion offset from the centre of said structure; and means for coupling a control pulse signal into the waveguide, said means comprising the first gate of the directional coupler, wherein the switch is substantially symmetrical for the control pulse signal and asymmetrical for the data pulse series.

2. An optical switch switchable in response to radiation, comprising:

a directional coupler, said directional coupler comprising:
a first gate forming part of an input of the switch and receiving an optical data pulse series,
a second gate forming part of an output of the switch,
a third gate, and
a fourth gate;

a waveguide structure interconnecting the third gate and the fourth gate and comprising a non-linear optical portion offset from the centre of said structure; and means for coupling a control pulse signal into the waveguide, said means comprising the first gate of the directional coupler, wherein the switch is substantially symmetrical for the control pulse signal and asymmetrical for the data pulse series, wherein the non-linear optical element is arranged at a distance d from the centre of the optical switch, for which it holds that:

$$d/c' \cong dx/c' \pm \Delta x'/c'$$

in which $dx/c'=T/4+n.T/2$ and $\Delta x'/c' \sim |t_1-t_2|$, in which c' is the velocity of light in the waveguide structure, T is the pulse period of the control pulse signal, n is an integer, $t_1$ and $t_2$ are the respective arrival times of the first and the second sub-pulse of the control pulse signal in the nonlinear optical portion, for which it holds that $t_1+t_2=T$, with $t_1 \neq t_2$.

3. An optical switch as claimed in claim 1, wherein the non-linear optical portion comprises a semiconductor laser amplifier.

4. An optical switch switchable in response to radiation, comprising:

a directional coupler, said directional coupler comprising:
a first gate forming part of an input of the switch and receiving an optical data pulse series,
a second gate forming part of an output of the switch,
a third gate, and
a fourth gate;

a waveguide structure interconnecting the third gate and the fourth gate and comprising a non-linear optical portion offset from the centre of said structure, said non-linear optical portion comprising a semiconductor laser amplifier which is polarization-insensitive; and means for coupling a control pulse signal into the waveguide, said means comprising the first gate of the directional coupler, wherein the switch is substantially symmetrical for the control pulse signal and asymmetrical for the data pulse series.

5. An optical switch as claimed in claim 2, wherein the non-linear optical portion comprises a semiconductor laser amplifier.

6. An optical switch as claimed in claim 5, wherein the semiconductor laser amplifier is polarization-insensitive.

7. An optical switch, comprising:

a directional coupler inputting a data pulse series and a control pulse signal; and an optical waveguide comprising a non-linear optical element offset from a centre of the optical waveguide of a position where the switch is substantially symmetrical for the control pulse signal and asymmetrical for the data pulse series.

8. The optical switch according to claim 7, wherein a width of the data pulse series is determined by a width of the control pulses and the distance the non-linear portion is offset from the centre of said optical waveguide.

9. The optical switch according to claim 1, wherein a width of the data pulse series is determined by a width of the control pulses and the distance the non-linear portion is offset from the centre of said optical waveguide.

10. An optical switch, comprising:

a directional coupler inputting a data pulse series and a control pulse signal and having an output; and an optical waveguide comprising a non-linear optical element offset from a centre of the optical waveguide at a position where the control pulse signal destructively interferes at the output and the data pulse series constructively interferes at the output.

* * * * *